United States Patent [19]

Branum et al.

[11] Patent Number: 5,655,372

[45] Date of Patent: Aug. 12, 1997

[54] MODULAR MASTER CYLINDER CONSTRUCTION

[75] Inventors: Leslie P. Branum, Troy; Pamela B. D'Hulster, Fair Haven, both of Mich.

[73] Assignee: Automotive Products (USA), Inc., Auburn Hills, Mich.

[21] Appl. No.: 663,857

[22] Filed: Jun. 19, 1996

[51] Int. Cl.⁶ .............................. F15B 7/00; B60T 11/26
[52] U.S. Cl. ................................................ 60/583; 60/585
[58] Field of Search ............................. 60/583, 585, 588, 60/589, 592

[56] References Cited

U.S. PATENT DOCUMENTS

| | | | |
|---|---|---|---|
| 4,566,276 | 1/1986 | Komorizono et al. | 60/585 |
| 4,590,765 | 5/1986 | Leigh-Monstevens | 60/585 |
| 4,893,473 | 1/1990 | Hool et al. | 60/585 X |
| 4,924,673 | 5/1990 | Barker et al. | 60/589 |
| 5,279,124 | 1/1994 | Aymond | 60/585 X |

FOREIGN PATENT DOCUMENTS

| | | | |
|---|---|---|---|
| 600388 | 8/1934 | Germany | 60/585 |
| 1153177 | 5/1989 | United Kingdom | 60/585 |

*Primary Examiner*—Hoang Nguyen
*Attorney, Agent, or Firm*—Young & Basile, P.C.

[57] ABSTRACT

A master cylinder assembly including an elongated tubular shell defining a bore sized to slidably receive a piston, an opening at one of the shell for passage of a piston rod for driving engagement with the piston, a high pressure outlet proximate the other closed end of the shell for connection to a conduit connecting to a slave cylinder, and a shell fitting in the form of a socket formed in the closed end wall of the shell. The assembly further includes a spout defining a plug fitting at one end for coupling insertion into the socket of the shell and a fitting at its other end for connection to a hose for connection to a remote reservoir, and an integral reservoir structure including a main body bowl portion and a spout formed integral with the lower end of the bowl portion and defining a plug at its free end for insertion into the socket in the end wall of the shell. If it is desired to provide a remote reservoir assembly, the spout is positioned in the socket of the shell and suitably secured in position and if it desired to provide an integral reservoir assembly the spout portion of the integral reservoir assembly is positioned in the socket of the shell.

7 Claims, 3 Drawing Sheets

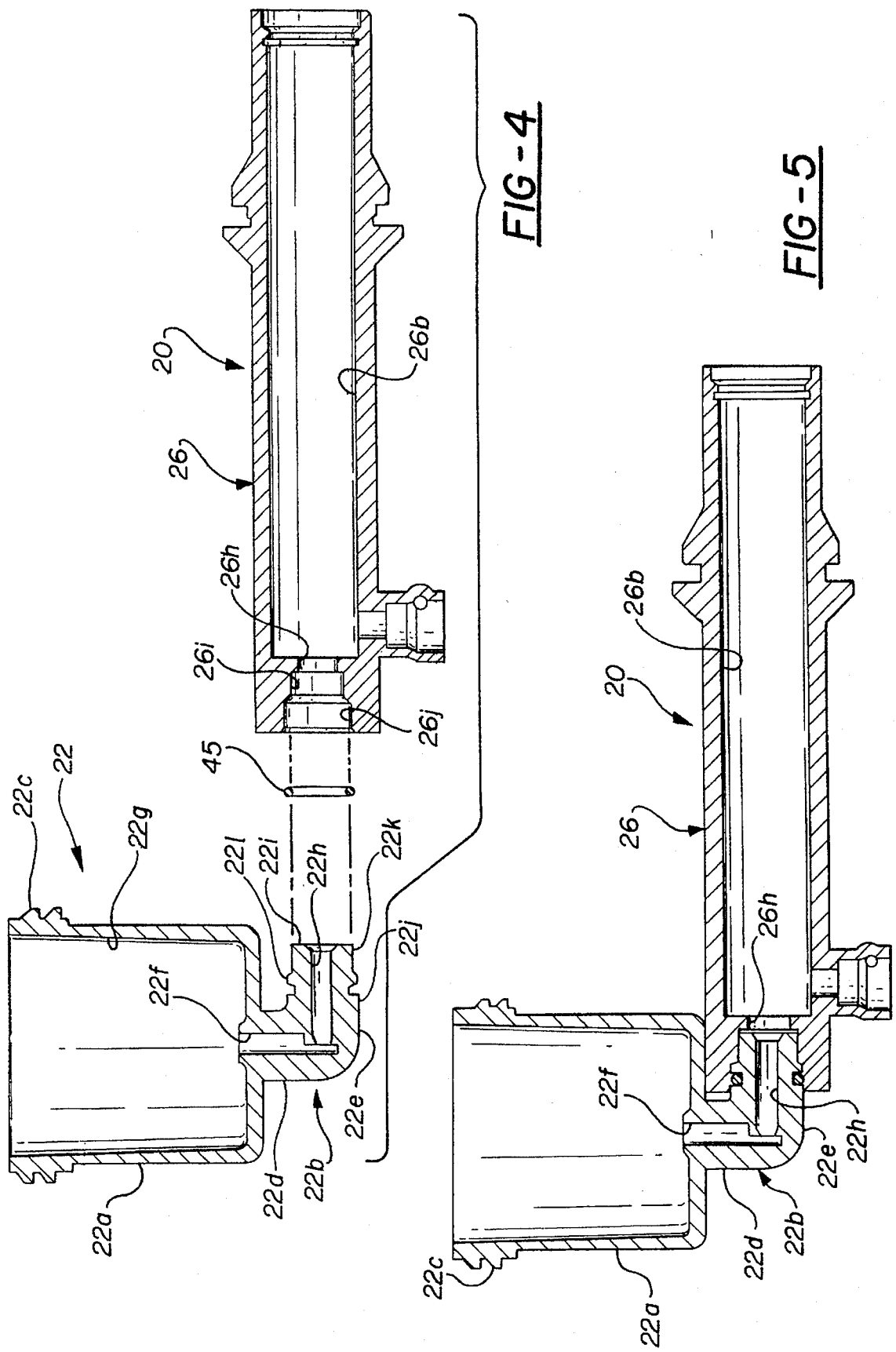

MODULAR MASTER CYLINDER CONSTRUCTION

BACKGROUND OF THE INVENTION

The present invention relates to a method and apparatus for transmitting mechanical movement from one location to another utilizing hydraulic fluid as the transmitting means. More particularly, the invention relates to a force transmission device employing interconnected hydraulic cylinders wherein pressure generated in one cylinder is transmitted to the other cylinder to achieve a desired movement or operation at a location remote from that at which the pressure force originates.

Such a device may be used for effecting mechanical operations in a motor vehicle such, for example, as actuating a mechanical clutch of the vehicle. In such use, a "master" cylinder is utilized to originate pressure flow which is transmitted by a conduit to a "slave" cylinder having an output member connected to the clutch release mechanism.

Master cylinder assemblies typically include either an integral reservoir structure in which the reservoir is positioned immediately adjacent the main body or shell of the master cylinder assembly or a remote reservoir structure in which a spout is provided immediately adjacent the shell of the master cylinder and the spout connects with a flexible conduit which in turn connects with a remotely relocated reservoir. In the past, the shell of the master cylinder has been uniquely constructed so as to be dedicated to association with either an integral reservoir or a remote reservoir. In effect, two distinct master cylinders and two distinct reservoirs have been required to accommodate the requirements of vehicle manufacturing customers.

SUMMARY OF THE INVENTION

This invention is directed to the provision a master cylinder assembly, and a methodology, allowing an identical master cylinder shell to be utilized with either an integral reservoir or a remote reservoir.

The master cylinder includes an elongated tubular shell defining a bore sized to slidably receive a piston, an opening at one end of the shell for passage of a piston rod for driving engagement with the piston, a high pressure outlet proximate the other, closed end of the shell for connection to a conduit connecting to a slave cylinder, and a shell fitting.

According to the invention methodology, a spout is provided for connection to a conduit connected to a remote reservoir and having a fitting sized to coact with the shell fitting to connect the shell to the spout and provide fluid communication between the bore and the spout; a reservoir is provided having a reservoir fitting corresponding to the spout fitting and sized to coact with the shell fitting to connect the shell and the reservoir and provide fluid communication between the bore and the reservoir; the spout is connected to the shell utilizing the spout fitting and the shell fitting to constitute a master cylinder assembly including a spout for connection via a conduit to a remote reservoir; and, alternatively, the reservoir is connected to the shell utilizing the reservoir fitting and the shell fitting to constitute a master cylinder assembly including an integral reservoir. This structure and methodology allows identical master cylinder shells to be utilized to provide both integral and remote reservoir assemblies.

According to a further feature of the invention a master cylinder assembly is provided comprising a shell and a spout. The shell is tubular and elongated and includes a bore sized to slidably receive a piston, an opening at one end of the shell for passage of a piston rod for driving engagement with the piston, a high pressure outlet proximate the other end of the shell for connection to a conduit connecting to a slave cylinder, and a fitting in an end wall of the shell proximate the other end of the shell. The spout defines a first end for connection to the shell, a second end for connection to a reservoir, a passage extending between the first and second ends, and a fitting on the first end of the spout for coaction with the shell fitting and operative in response to relative coupling movement between the fittings to establish communication between the interior of the shell and the reservoir.

According to a further feature of the invention, the spout is formed as an integral part of a reservoir structure so that communication may be established between the interior of the shell and the main body of the reservoir by coupling the spout fitting and the shell fitting.

According to a further feature of the invention, the spout fitting comprises a discrete part separate from the reservoir and is adapted to be connected to the reservoir by a conduit connected to the first end of the spout. With this arrangement, communication may be readily established between a remote reservoir and the interior of the shell by coupling the fittings together.

According to a further feature of the invention, the fitting in the shell comprises a socket and the fitting on the spout comprises a plug sized to fit in the socket. This specific arrangement allows the socket to be readily and positively coupled to the shell.

According to a further feature of the invention, the master cylinder assembly includes an elongated tubular shell defining a bore sized to slidably receive a piston, an opening at one end of the shell for passage of a piston rod for driving engagement with the piston, a high pressure outlet proximate the other end of the shell for connection to a conduit connecting to a slave cylinder, and a shell fitting; and the master cylinder assembly further includes a spout having first and second ends interconnected by a passage with a fitting on the first end for coaction with the shell fitting and a fitting on the second end for coaction with a conduit for connection to a remote reservoir. With this arrangement, communication may be established between the interior of the shell and a remote reservoir simply by coupling the fitting on the first end of the spout to the shell and coupling the fitting on the second end of the spout to a conduit connected to the remote reservoir.

BRIEF DESCRIPTION OF THE DRAWING

FIGS. 4 and 5 are longitudinal cross-sectional views showing the manner in which the invention master cylinder is configured to provide an integral reservoir construction.

DETAILED DESCRIPTION OF THE PREFERRED EMBODIMENT

Figure 1:
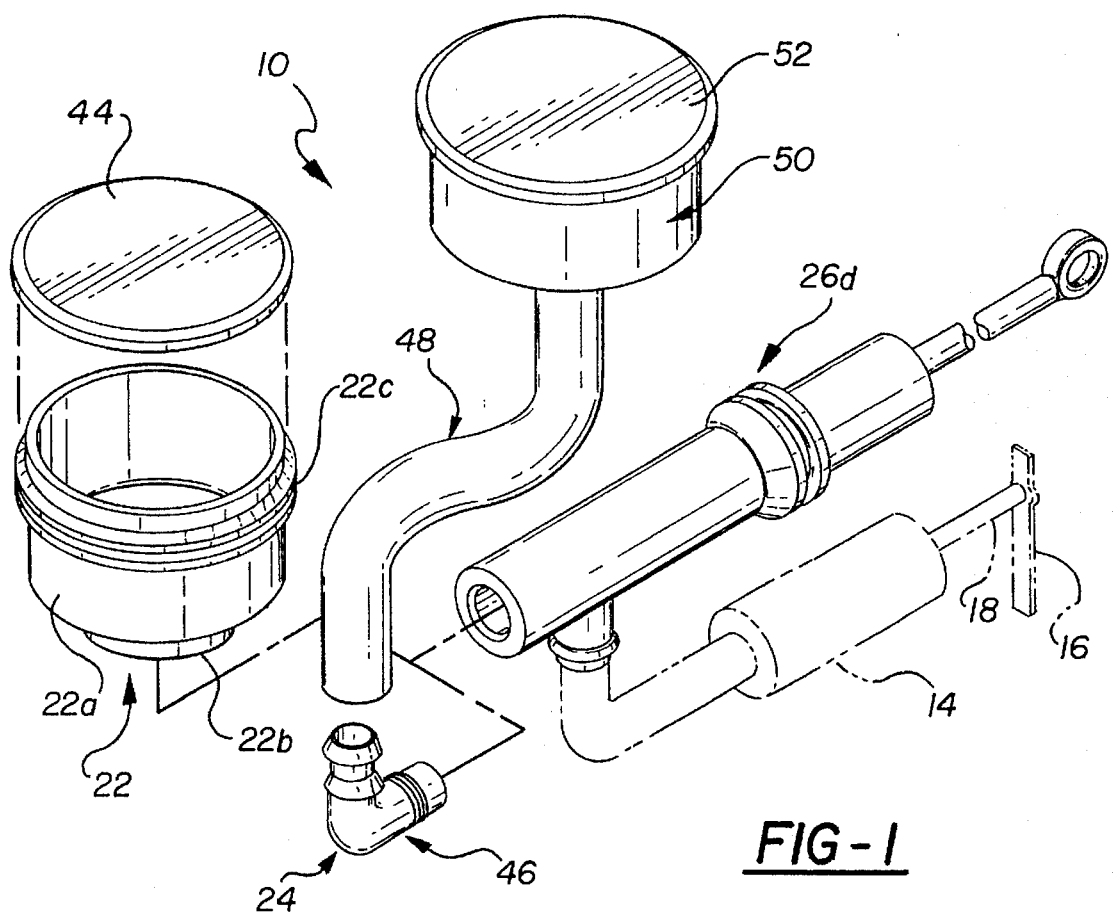
FIG. 1 is an exploded view of a master cylinder assembly according to the invention.
Figure 3:
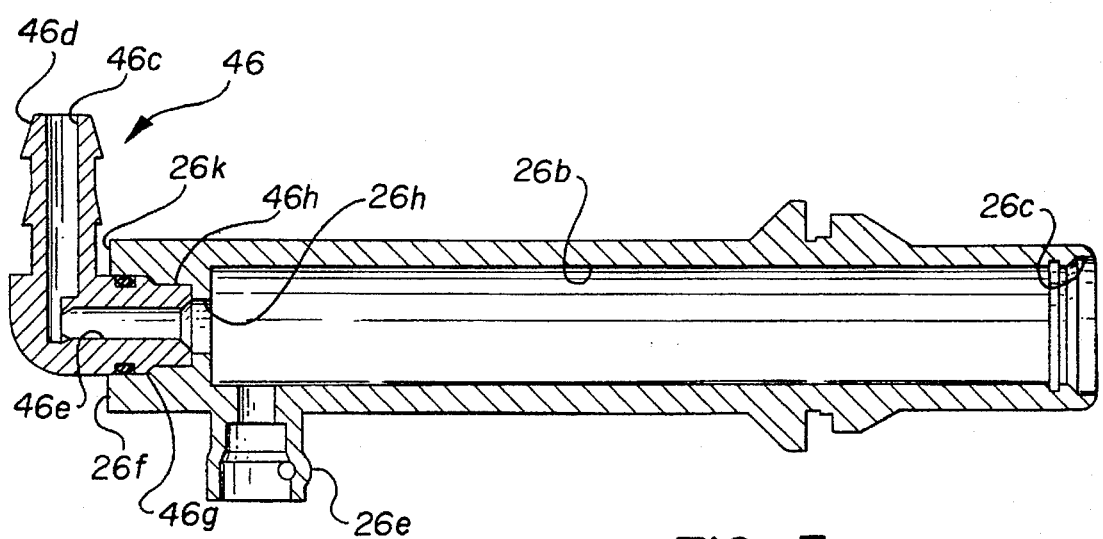
FIGS. 2 and 3 are longitudinal cross-sectional views showing the manner in which the master cylinder is configured to provide a remote reservoir construction.
Figure 2:
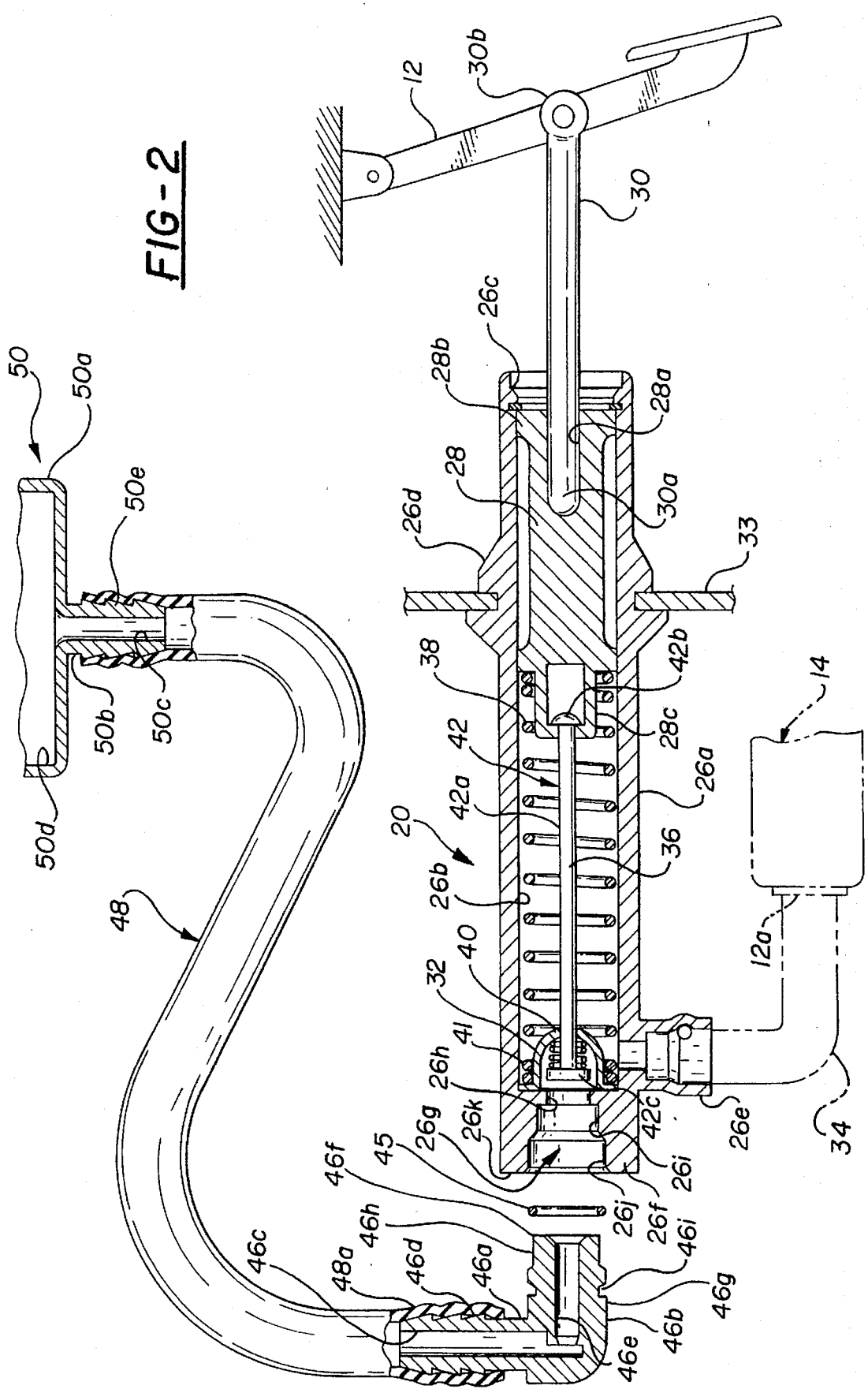

The invention master cylinder apparatus is disclosed as forming a part of a hydraulic clutch control apparatus for controlling the clutch of a motor vehicle. The clutch control apparatus includes a master cylinder apparatus 10 for operative association with the clutch pedal 12 of the motor vehicle and a slave cylinder assembly 14 for operative association with the clutch release lever 16 of the motor vehicle so that, in known manner, depression and release of clutch pedal 12 operates via the clutch control apparatus to extend and retract the piston rod 18 of the slave cylinder assembly and thereby disengage and engage the clutch.

Master cylinder apparatus 10, broadly considered, includes a master cylinder assembly 20, an integral reservoir structure 22, and a remote reservoir assembly 24.

Master cylinder assembly 20 includes a tubular shell or body 26, a piston 28, a piston rod 30, and a valve assembly 32.

Shell 26 is formed of a suitable plastic material, is elongated, and includes a main body 26a defining a central axial bore 26b including an open end 26c. A flange structure 26d on the exterior of the shell is utilized in known manner to rigidly mount the shell 26 in the firewall 33 of the motor vehicle. Shell 26 further defines a high pressure outlet 26e proximate the closed rearward end 26f of the shell for connection in known manner to a hose or conduit 34 connected to the inlet 12a of the slave cylinder 12. A fitting or socket 26g is provided in the closed end 26f of the shell and includes a bore 26h concentric with the central axis 36 of the shell and opening in bore 26b; a counterbore 26i; and a further counterbore 26j opening in the rear face 26k of the shell.

Piston 28 is slidably mounted in bore 26b and includes a recess 28a proximate its forward end 28b for receipt of the rearward end 30a of piston rod 30. The other or forward end 30b of the piston rod is pivotally secured in known manner to the clutch pedal 12 so that depression of the clutch pedal operates to move the piston 28 rearwardly within bore 26b so as to deliver pressurized hydraulic fluid via fitting 26e and hose 34 to slave cylinder 12 for extension of slave cylinder piston rod 18 and operation of clutch release lever 16 in a manner to disengage the clutch. The rearward movement of the piston 28 in bore 26b is resisted in known manner by a coil spring 38.

Valve assembly 32 is positioned in bore 26b proximate bore 26h and includes an open structure cage 40, a coil spring 41, and a valve stem structure 42. Cage 40 includes a flange portion 40a against which spring 38 bears so as to retain the cage in position adjacent the rear end of bore 26b. Valve stem structure 42 includes a main body stem portion 42a, a head portion 42b, and a valve portion 42c positioned within cage 40 in proximity to bore 26h and engaged by spring 41. Head 42b coacts with a rearward piston structure 28c so that the piston is free to move rearwardly within the bore 26b relative to stem 42a whereas forward movement of the piston within the bore 26b engages head 42b and pulls the valve 42c away from bore 26h against the resistance of spring 41. In this manner, the valve 42c acts, under the urging of spring 41, to seal the bore 26h in response to rearward movement of the piston upon depression of the clutch pedal so as not to interfere with the discharge of pressurized fluid from the fitting 26e whereas forward return movement of the piston upon release of the clutch pedal acts to pull the valve 42c clear of bore 26h against the resistance of spring 41 and allow fluid from the reservoir to flow through cage 40 and fill bore 26b behind the advancing piston.

Reservoir structure 22 is formed of a suitable plastic material, such as the plastic material of the shell 26, and includes a main body bowl portion 22a, a spout portion 22b, and a cover or lid 44 adapted to be removably secured to the upper end of the bowl portion 22a utilizing threads 22c coacting with threads on the lid.

Spout portion 22b has an L-shaped configuration and includes a vertical leg 22d and a horizontal leg 22e. Vertical leg 22d includes a central bore 22f communicating at its upper end with the central cavity 22g of the bowl portion 22a and horizontal leg 22e includes a central horizontal bore 22h communicating at one end with the lower end of bore 22f and opening at its other end in the front face 22i of the horizontal leg. The front end of the horizontal leg 22e comprises a coacting fitting with respect to shell fitting 26g and, specifically, has a plug configuration of circular cross section including a relatively large diameter plug section 22j and a concentric relatively small diameter plug section 22k. Large diameter plug section 22j includes an external groove 22l for coaction with an O-ring 45. Relatively small diameter section 22k has a size and configuration generally corresponding to the size and configuration of the counterbore 26i of shell socket 26g and relatively large diameter section 22j has a size and configuration generally corresponding to the size and configuration of the counterbore 26j of shell socket 26g so that the plug fitting defined by the leading end of the horizontal leg of the spout of the reservoir may be plugged into the socket fitting 26g to seat section 22i in counterbore 26i and seat section 22j in counterbore 26j so as to provide fluid communication between the shell bore 26b and the reservoir cavity 22g via bores 22f, 22h, and 26h.

Remote reservoir assembly 24 includes a spout 46, a hose 48, and a remote reservoir 50.

Spout 46 is formed of a suitable plastic material, such as the plastic material of shell 26 and reservoir structure 22, and has an L-configuration including a vertical leg 46a and a horizontal leg 46b. Vertical leg 46a includes a central bore 46c opening at the upper end of the vertical leg, and barbs or serrations 46d are provided on the exterior surface of the vertical leg.

Horizontal leg 46b includes a central bore 46e communicating at one end with bore 46c and opening at its other end in the front face 46f of the horizontal leg.

The front end of lower leg 46b comprises a coacting fitting with respect to socket fitting 26g and, specifically, has a plug configuration corresponding precisely to the plug configuration of the front end of the horizontal leg 22e of the spout portion of reservoir structure 22 and includes a relatively large diameter section 46g and a relatively small diameter section 46h. Section 46g has a size and configuration corresponding to the size and configuration of the counterbore 26a of shell socket 26g and section 46h has a size and configuration corresponding to the size and configuration of counterbore 26i of shell socket 26g so that the plug fitting defined by the leading end of the horizontal leg of spout 46 may be plugged into socket fitting 26g to seat section 46h in counterbore 26i and seat section 46g in counterbore 26j and provide fluid communication between the shell bore 26b and spout bore 46c via bores 46e and 26h. An O-ring 45 seats in an external groove 46i of the plug to facilitate the seal between the plug and the cylinder.

Hose 48 is formed of any suitable resilient and flexible material and is adapted to be removably positioned at its lower end 48a over the upper end of vertical leg 46a of spout 46 utilizing barbs 46d.

Remote reservoir 50 is formed of a suitable plastic material, such as the plastic of shell 26 and reservoir structure 22, and includes a main body bore portion 50a, a lower spout portion 50b providing a central bore 50c communicating with the interior cavity 50d of bore 50a, and a removable cap or lid 52. The upper end 48b of hose 48 is removably secured to fitting 50b utilizing barbs 50e defined on the exterior surface of the fitting.

It will be seen that the invention provides an apparatus and methodology for providing both a master cylinder remote reservoir assembly and a master cylinder integral reservoir assembly utilizing precisely the same main body shell unit. Specifically, if it is desired to provide a remote reservoir assembly, a spout 46 is positioned in the socket 26g of the shell and suitably secured in position and if it is desired to provide an integral reservoir assembly the spout portion 22b of an integral reservoir 22 is positioned in socket 26g and suitably secured therein. Securement of the plug end of the spout 46 or the plug end of the spout portion of the reservoir structure 22 may be achieved through the use of a snap fit, the use of a mounting clip, or, as shown, by welding. The welding may in turn be accomplished in a variety of manners such, for example, as sonic welding.

Although a preferred embodiment of the invention has been illustrated and described in detail, it will be apparent that various changes may be made and disclosed in the embodiment without departing from the scope or spirit of the invention.

We claimed:

1. A method of providing master cylinder assemblies of both integral and remote reservoir design comprising:

providing a master cylinder having an elongated tubular shell defining a bore sized to slidably receive a piston, an opening at one end of the shell for passage of a piston rod for driving engagement with the piston, a high pressure outlet proximate the other end of the shell for connection to a conduit connecting to a slave cylinder, and a shell fitting proximate the other end of the shell having a coupling configurating;

providing a spout for connection to a conduit connected to a remote reservoir and having a fitting having a coupling configuration and sized to coact with the coupling configuration of the shell fitting to connect the shell to the spout and provide fluid communication between the bore and the spout;

providing an integral reservoir having a reservoir fitting having a coupling configuration corresponding precisely to the coupling configuration of the spout fitting and sized to coact with the coupling configuration of the shell fitting to connect the shell and the reservoir and provide fluid communication between the bore and reservoir;

connecting the spout to the shell utilizing the spout fitting configuration and the coacting shell fitting configuration to constitute a master cylinder assembly including a spout for connection by a conduit to a remote reservoir; and alternately, connecting the reservoir to the shell utilizing the reservoir fitting configuration and the coacting shell fitting configuration to constitute a master cylinder assembly including an integral reservoir.

2. A method according to claim 1 wherein:

the shell fitting comprises a socket formed in a wall of the shell; and the spout fitting and the reservoir fitting define plugs sized to fit in the socket and the shell wall.

3. A method according to claim 2 wherein:

the shell wall comprises an end wall proximate said other end.

4. A method according to claim 2 wherein:

the reservoir fitting and the spout have an L configuration with one leg of the configuration in each case defining the plug for receipt in the shell socket and the other leg of the configuration providing communication with the reservoir.

5. A master cylinder assembly comprising:

an elongated tubular cylinder shell defining a bore sized to slidably receive a piston, an opening at one end of the shell for passage of a piston rod for driving engagement with the piston, a high pressure outlet proximate the other end of the shell for connection to a conduit connecting to a slave cylinder, and a shell fitting proximate the other end of the shell having a coupling configuration;

a remote reservoir;

a flexible conduit connected at a first end thereof to the remote reservoir;

a spout having first and second ends interconnected by a passage with a fitting on the first end of the spout having a coupling configuration for coaction with the shell fitting and a fitting on the second end of the spout for coaction with a second end of the conduit; and an integral reservoir having a reservoir fitting having a coupling configuration corresponding precisely to the coupling configuration of the spout fitting;

whereby the spout may be connected to the shell utilizing the spout fitting configuration and the coacting shell fitting configuration to constitute a master cylinder assembly including a remote reservoir or, alternately, the reservoir may be connected to the shell utilizing the reservoir fitting configuration and the coacting shell fitting configuration to constitute a master cylinder assembly including an integral reservoir.

6. A master cylinder assembly according to claim 5 wherein the fitting on the first end of the spout comprises a plug and the shell fitting comprises a socket adapted to receive the plug.

7. A master cylinder assembly according to claim 6 wherein the shell fitting is provided in an end wall of the shell proximate the other end of the shell.

* * * * *